United States Patent Office 3,651,110
Patented Mar. 21, 1972

3,651,110
NICKEL DERIVATIVES OF SALICYLIC ACID ESTERS AND A PROCESS FOR PREPARING THE SAME
Laird Gordon Lindsay Ward, Suffern, N.Y., assignor to The International Nickel Company, Inc., New York, N.Y.
No Drawing. Filed Nov. 3, 1969, Ser. No. 873,618
Int. Cl. C07f 15/04; C08f 45/62
U.S. Cl. 260—439 R
9 Claims

ABSTRACT OF THE DISCLOSURE

Nickel derivatives of salicylic acid esters, e.g., anhydrous nickel-2-carbmethoxyphenoxide, and a process for preparing the same in which a salicylic acid ester such as methylsalicylate, a Group Ia metal alkoxide and a nickel salt are reacted in an essentially non-aqueous environment, and the nickel derivative is precipitated from solution. Anhydrous nickel-2-carbmethoxyphenoxide prepared by this process is effective as a light stabilizing additive in polymers such as polyvinylchloride.

---

This invention relates to novel nickel derivatives of salicylic acid esters, to a process for preparing such nickel derivatives and to polymer systems having improved stability.

Nearly all plastics are degraded by extended exposure to outdoor weathering. Much of the weathering which occurs is directly attributable to exposure to light, and particularly, to the ultra-violet component thereof. Polyvinylchloride (PVC), an important vinyl polymer, is particularly light-sensitive and suffers extensive degradation including both discoloration and embrittlement upon exposure to light. Many attempts have been made to stabilize these polymers by introducing various additives, and some improvement in their stability upon exposure to light has been effected in a number of cases. However, more effective and more economical stabilizers are needed.

A process has now been discovered in which a salicylic acid ester, a Group Ia metal alkoxide and a nickel halide are reacted to precipitate the nickel derivative of the salicylic acid ester. In this connection while the crystalline dihydrate of methyl nickelosalicylate has been prepared, so far as is known the compound without associated water molecules has not been prepared. The dihydrate, on heating, undergoes exothermic decomposition, leaving a nickel oxide residue.

It has further been discovered that the novel compounds prepared by the process of the invention are useful as additives to polymer systems in that they improve the light stability of such systems.

It is an object of the invention to provide a process for making the nickel derivatives of salicylic acid esters.

It is another object of this invention to provide a method for making anhydrous nickel-2-carbmethoxyphenoxide.

Another object of the invention is to provide a vinyl polymer system having improved stabilization characteristics against degradation by light.

Other objects and advantages will become apparent from the following description.

Generally speaking, the present invention contemplates a process for making nickel derivatives of salicylic acid esters having the general formula,

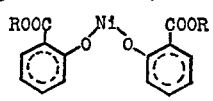

in which R is selected from the group consisting of alkyls, e.g., methyl; substituted alkyls, e.g., 2-ethylhexyl; aryls, e.g., phenyl; alkaryls, e.g., octylphenyl; aralkyls, e.g., phenylethyl; cycloaliphatics, e.g., cyclohexyl; alkyl or aryl substituted cycloaliphatics, e.g., methyl cyclohexyl; or combinations thereof. The compounds provided in accordance with the invention are useful as light stabilizing additives for polymers, particularly the vinyl polymers such as polyvinylchloride and polyvinyl acetate, but may also improve the light stability of polyolefins such as polyethylene and polypropylene.

More particularly, the nickel derivatives of salicylic acid esters are prepared by reacting a salicylic acid ester having the general formula,

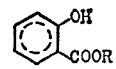

in which R is selected from the group consisting of alkyls, e.g., methyl; substituted alkyls, e.g., 2-ethylhexyl; aryls, e.g., phenyl; alkaryls, e.g., octylphenyl; aralkyls, e.g., phenylethyl; cycloaliphatics, e.g., cyclohexyl; alkyl or aryl substituted cycloaliphatics, e.g., methyl cyclohexyl; a Group Ia metal alkoxide which advantageously is the reaction product of a Group Ia metal, e.g., lithium, sodium or potassium and an alcohol having from 1 to 4 carbon atoms, e.g., methanol, ethanol, propanol, isopropanol, n-butanol, isobutanol or sec-butanol; and an anhydrous, or substantially anhydrous, nickel halide in an essentially non-aqueous solvent, particularly one selected from the group consisting of methanol, ethanol, propanol, isopropanol, n-butanol, isobutanol, sec-butanol, acetone, tetrahydrofuran, dimethoxyethane and dimethylformamide; and precipitating the nickel derivative.

Advantageously, the methyl ester of salicylic acid ($HO_6H_4COOCH_3$) may be utilized as a reactant in the reaction outlined above, thereby producing the nickel derivative of the ester, nickel-2-carbmethoxyphenoxide ($C_{16}H_{14}NiO_6$). Some other satisfactory esters which may be employed in the reaction are n-octyl salicylate, 2-ethylhexyl salicylate and octylphenyl salicylate.

In selecting a Group Ia metal for this reaction, it must be noted that rubidium and cesium are highly reactive Group Ia metals, and for that reason, are less desirable for the contemplated reaction to produce an alkoxide. Also, rubidium chloride is not very soluble in alcohol, and cesium chloride is quite hygroscopic, these properties being disadvantageous in the reactions of the invention as will be more fully explained hereinafter. While the anhydrous nickel halide can be used in its pure form as a reactant to the extent that it is soluble in the non-aqueous solvent, it is advantageous to provide the nickel halide in the more soluble form of an anhydrous organic complex. Such a soluble organic complex may be prepared by reacting the hydrated nickel halide (chloride, bromide or iodide) with peroxide-free, ethylene-glycol dimethylether (EGDE). The product of this reaction is nickel halide dimethoxyethanate (nickel halide·EGDE complex). The nickel halide·EGDE complex is quite soluble in alcohol and it is also soluble in acetone, tetrahydrofuran, dimethoxyethane and dimethylformamide.

The alcohols employed in the process, which desirably contain from 1 to 4 atoms, may function as solvents as well as reactants, i.e., the stoichiometric amount of alcohol functioning as a reactant while the excess alcohol functions as a solvent. Alcohols having more than 4 carbon atoms are less reactive at the reaction temperatures characterizing this process, and for that reason, are not as well suited for use as solvents, although they will react with the alkali metal. Alcohols having up to 12 carbon atoms may be used as reactants, but the higher alcohols, e.g., isoamyl alcohol, may react more slowly, and the system may have to be heated to obtain the reaction. Under normal conditions, the tertiary butyl alcohol does not react with lithium or sodium.

In order to obtain a relatively pure product upon precipitation of the nickel derivative of a silicylic acid ester from solution, it will be understood that the by-product of the reaction, i.e., the alkali metal halide, must be soluble in the solvent employed to facilitate separation of the product from the by-product. Since alcohols are advantageous solvents, it will be apparent that reactants which result in the production of by-products which are relatively insoluble, or only slightly soluble, in alcohols, such as lithium fluoride, sodium fluoride, sodium chloride, sodium bromide, potassium fluoride, potassium chloride, potassium bromide, rubidium fluoride, rubidium bromide and cesium fluoride, are not entirely suitable for the practice of this process, if an alcohol is used as solvent.

It is possible, though less convenient, to use other solvents in the process (with alcohol functioning only as a reactant) including acetone, tetrahydrofuran, dimethoxyethane and dimethylformamide. The nickel halide·EGDE complex and the by-product alkali metal halides such as lithium chloride, lithium bromide, lithium iodide, sodium iodide potassium iodide, rubidium iodide, cesium chloride, cesium bromide and cesium iodide will dissolve n these solvents.

The sequence in which the reactions of the invention are conducted is of significant importance. Thus, for example, where methyl salicylate is the salicylic acid ester employed, the methyl salicylate is first reacted with the Group Ia metal alkoxide to form a Group Ia metal methyl salicylate. The Group Ia metal methyl salicylate is reacted with a nickel dihalide whereupon the Group Ia metal ions of at least two molecules of the salicylate are replaced by nickel which links the two molecules and the products of the reaction are anhydrous nickel-2-carbmethoxyphenoxide and a Group Ia metal halide. A direct reaction does not readily occur between nickel dihalide and methyl salicylate.

The desired reactions do not occur when attempted in aqueous solution. Thus, methyl salicylate is immiscible with water and at ambient temperature substantially no reaction takes place between the ester and soluble Group Ia alkali metal compounds. At elevated temperatures, after prolonged contact, a reaction occurs which results in hydrolysis of the ester, and the desired product, anhydrous nickel-2-carbmethoxyphenoxide, is not achieved. The desired product is obtained by carrying out the reaction at ambient temperature under non-aqueous conditions.

After the reaction, the resultant fluid mixture is concentrated by evaporation of methanol, and then cooled to precipitate the crystalline product which can then be separated from the remaining fluid by filtration. The crystalline material obtained is then rinsed in anhydrous alcohol to remove impurities and alcohol-soluble by-products, and dried under anhydrous conditions, e.g., dry nitrogen, to avoid possible contamination with water. Drying may also be accomplished under vacuum.

The use of nickel derivatives of salicylic acid esters as light stabilizers for vinyl polymers such as polyvinylchloride, calls for mixing the nickel compound with the polymer, for example, in a small but effective proportion of up to 10 parts by weight of compound, e.g., one part by weight of compound, per 100 parts by weight of the polymer, and with other necessary ingredients, at a temperature from about 75° F. to about 285° F., until the powder mixture is well blended and then, after cooling, extruding the powder mixture or otherwise processing it to final form.

Ordinarily, a minimum of at least 0.25 part by weight of compound per 100 parts by weight of polymer is required to effect a substantial degree of stabilization. A highly satisfactory addition is about one part by weight of compound per 100 parts by weight of polymer. The treated polymer is characterized by a substantial ability to resist degradation upon exposure to natural or strong artificial light for an extended period.

In order to give those skilled in the art a better understanding of the invention, particularly the preparation of compounds in accordance with the invention, the following illustrative example is given:

EXAMPLE

Preparation of a nickel chloride dimethoxyethanate (nickel chloride·EDGE complex)

One liter of a peroxide-free ethylene-glycol dimethylether, 331 grams (2.0 moles) of pulverized nickel chloride dihydrate and 651 grams (4.4 moles) of triethylorthoformate as a dehydrating agent were vigorously stirred at reflux temperature under nitrogen for about 2 hours in a three necked 3-liter flask fitted with a reflux condenser and a mechanical stirrer. At this stage, a Karl Fischer titration of the supernatant green liquid showed it to contain less than 0.04 milligram of $H_2O$ per milliliter solvent. The completed reaction slurry was cooled and the orange granular solids were collected under nitrogen, rinsed successively with anhydrous monoglyme, then pentane, and dried in a nitrogen atmosphere at 26° C. and a pressure of 20 cm. Hg. The yield was nearly quantitative (about 430 grams). The calculated analysis for $C_4H_{10}Cl_2O_2Ni$, the empirical formula for nickel chloride dimethoxyethanate, was as follows: 21.8% carbon; 4.59% hydrogen; 32.27% chlorine; 26.72% nickel; balance oxygen. The observed analysis was: 21.59% carbon; 4.72% hydrogen; 31.98% chlorine; 26.54% nickel; balance oxygen (by difference).

Preparation of anhydrous nickel-2-carbmethoxyphenoxide 6.9 grams (1 gram atom) of lithium was added to a flask containing 800 milliliters of absolute methanol under a nitrogen atmosphere, producing a solution of lithium methoxide. Thereafter, 155 grams (1.02 moles) of methyl salicylate was added to the solution of lithium methoxide, the mixture then being at a temperature of about 40° C. To this mixture, nickel chloride·EGDE complex (110 grams, 0.5 mole) in methanol (200 milliliters) was added. The resulting green slurry was filtered to separate the product precipitate (157 grams, melting point 226–227° C.). The product was then washed twice with methanol (200 milliliters of methanol each time), twice with pentane (200 milliliters of pentane each time), and then dried for 4 hours at 110° C. in vacuum. The calculated analysis for $C_{16}H_{14}NiO_6$, the empirical formula for anhydrous nickel-2-carbmethoxyphenoxide, was as follows: 53.23% carbon, 3.91% hydrogen, 16.26% nickel, 26.59% oxygen. The observed analysis of the precipitate was: 48.25% carbon, 4.80% hydrogen and 18.65% nickel, balance oxygen (by difference). The reactions are believed to take place as follows:

(1) $Li + 2CH_3OH \rightarrow 2CH_3OLi + H_2\uparrow$ (2) $CH_3OLi + HOC_6H_4COOCH_3$
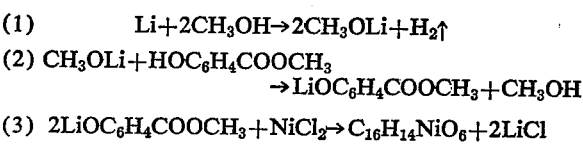

(3) $2LiOC_6H_4COOCH_3 + NiCl_2 \rightarrow C_{16}H_{14}NiO_6 + 2LiCl$

Anhydrous nickel-2-carbmethoxyphenoxide was found to be insoluble in water, hexane, benzene, methylene chloride, chloroform, carbon tetrachloride, acetonitrile, trichlorethylene and ether. It was slightly soluble in methanol and soluble in dimethyl sulfoxide, acetone, tetrahydrofuran and nitromethane upon prolonged boiling in these solvents.

The lithium chloride by-product has adequate solubility in methanol to permit relatively complete removal of this salt in the dissolved state. Anhydrous nickel-2-carbmethoxyphenoxide, as well as other nickel derivatives of salicylic acid esters, may also be prepared from monoglyme complexed nickel bromide. In this case, the by-product lithium bromide has a high solubility in the methanol solvent reaction medium, and thus contamination with lithium salts is minimized. Further, an anhydrous solution of nickel halide in a mixture of ethyl alcohol and ethyl formate is also satisfactory for the preparation of nickel derivatives of salicylic acid esters. Such nickel halide complex is prepared by reacting a hydrated nickel halide with triethyl orthoformate. A reaction of the following type is believed to take place:

$$NiCl_2 \cdot 2H_2O + 2HC(OC_2H_5)_3 \xrightarrow{C_2H_5OH} NiCl_2 + 4C_2H_5OH + 2C_2H_5OC(O)H$$

The nickel halide solution thus obtained may then be reacted with a Group Ia metal derivative of salicylic acid ester as described herein to produce the desired end product.

The anhydrous nickel-2-carbmethoxyphenoxide (Compound 1), prepared as herein described, was evaluated as a light stabilizer by incorporation in polyvinylchloride (PVC) film samples. In preparing the PVC film, one part by weight of the anhydrous nickel-2-carbmethoxyphenoxide was added to 100 parts by weight of PVC powder in the dry-mixing head of the Brabender plastograph, a sigma blade mixer. The mixture was heated to 230° F. At this point, 50 parts of dioctyl phthalate, a plasticizer, was added. Heating continued to 260° F., and 2 parts of a glyceride lubricant (Glycolube RP) was added. The batch was further dry blended for 10 minutes at 260° F. to 280° F. and then cooled. The blended powder was then transferred to an extruder hopper and fed into the extruder screw. The extrusion was carried out at a temperature of 330° F. and a 2-inch wide by 0.01-inch thick film was extruded. The film was cut into about 9½-inch lengths which were clamped in suitable holders under slight tension with about 8½ inches exposed for weathering. Film holders were provided with PVC film samples incorporating the stabilizing nickel compound of the invention and with an uninhibited PVC film sample (blank). The PVC film samples were exposed to accelerated weathering conditions including simulated sunshine (carbon arc illumination) and rain (water-spray) in a suitable testing device (Sunshine Carbon Arc Weather-O-Meter). The cycle time on accelerated weathering was 102 minutes of simulated sunshine followed by 18 minutes of simulated sunshine and rain.

In this test, the uninhibited blank failed in 270 hours, in striking contrast to the sample containing Compound 1, which failed only after 980 hours of exposure. Accordingly, it is seen that anhydrous nickel-2-carbmethoxyphenoxide substantially improves the stability of polyvinyl-chloride against degradation upon exposure to light.

It appears that some small portion of the light-stabilizing additive, $C_{16}H_{14}NiO_6$ may undergo thermal rearrangement in the presence of residual amounts of hydroxyl-containing material, e.g., alcohol, in the processing of the polymer system as described above. However, substantial amounts of $C_{16}H_{14}NiO_6$ remain in the polymer system and, in any case, the products of the thermal rearrangement are not deleterious.

An efficient and relatively simple process has thus been presented for the preparation of nickel derivatives of salicylic acid esters and the usefulness of such nickel compounds, has been demonstrated as light stabilizing additives for polymers.

Although the present invention has been described in conjunction with preferred embodiments, it is to be understood that modifications and variations may be resorted to without departing from the spirit and scope of the invention as those skilled in the art will readily understand. Such modifications and variations are consider to be within the purview and scope of the invention and appended claims.

I claim:
1. A process for preparing a nickel derivative of a salicylic acid ester which comprises the steps of
  (a) reacting, in an essentially non-aqueous solvent, a Group Ia metal alkoxide with a salicylic acid ester having the following general formula,

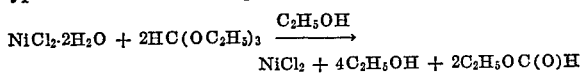

in which R is selected from the group consisting of alkyls, substituted alkyls, aryls, alkaryls, aralkyls, cycloaliphatics or alkyl or aryl substituted cycloaliphatics;
  (b) reacting an anhydrous nickel halide complex selected from the group consisting of a nickel halide dimethoxyethanate complex and an anhydrous solution of nickel halide in a mixture of ethyl formate and ethyl alcohol with the reaction product of step (a); and
  (c) precipitating the resulting nickel derivatives of the salicylic acid ester.

2. The process of claim 1 wherein the salicylic acid ester is selected from the group consisting of methyl salicylate, n-octyl salicylate, 2-ethylhexyl salicylate and octyl phenyl salicylate.

3. The process of claim 1 wherein the solvent is selected from the group consisting of methanol, ethanol, propanol, isopropanol, n-butanol, isobutanol, sec-butanol, acetone, tetrahydrofuran, dimethoxyethane and dimethylformamide, and the Group Ia metal alkoxide reactant is the reaction product of a Group Ia metal selected from the group consisting of lithium, sodium and potassium, and an alcohol selected from the group consisting of methanol, ethanol, isopropanol, n-butanol, isobutanol and sec-butanol.

4. The process of claim 3 wherein R is a methyl group.

5. The process of claim 3 wherein the solvent is methanol.

6. The process of claim 5 wherein the Group Ia metal alkoxide reactant is the reaction product of lithium and methanol.

7. The process of claim 6 wherein R is a methyl group.

8. The process of claim 4 wherein the Group Ia metal alkoxide reactant is lithium methoxide and the anhydrous nickel halide complex is nickel halide dimethoxyethanate produced by the reaction of nickel chloride dihydrate and ethyleneglycol dimethylether with provision to remove water during the reaction.

9. A process of preparing anhydrous nickel-2-carbmethoxyphenoxide under anhydrous conditions which comprises first reacting in methanol, methyl salicylate and methanolic lithium methoxide, then introducing as a reactant nickel chloride dimethoxyethanate and thereafter precipitating anhydrous nickel-2-carbmethoxyphenoxide.

References Cited

UNITED STATES PATENTS 3,196,128   7/1965   Tazewell et al. _____ 260—45.75

OTHER REFERENCES

Graddon et al.: Aust. J. Chem. 20 (1967) pp. 21–33.
Kirk-Othmer Encyclopedia of Chemical Technology Interscience Publishers, New York, N.Y., vol. 13, 1966, pp. 754–5.

JAMES E. POER, Primary Examiner
A. P. DEMERS, Assistant Examiner

U.S. Cl. X.R.
260—45.75 N